(12) United States Patent  (10) Patent No.: US 7,987,939 B2
Kisiler et al.  (45) Date of Patent: Aug. 2, 2011

(54) HOOD SYSTEM WITH MULTIPLE OPEN POSITIONS

(75) Inventors: Mark Kisiler, Torrance, CA (US); Donald W. Powell, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 243 days.

(21) Appl. No.: 12/328,547

(22) Filed: Dec. 4, 2008

(65) Prior Publication Data

US 2010/0140005 A1   Jun. 10, 2010

(51) Int. Cl.
*B62D 25/10* (2006.01)
(52) U.S. Cl. .................... 180/69.2; 180/69.21
(58) Field of Classification Search .............. 180/69.2, 180/69.21, 69.22, 69.23, 69.24, 69.25, 89.13, 180/89.14, 89.15, 89.16, 89.17, 89.18, 89.19, 180/274; 16/221, 374; 267/195
See application file for complete search history.

(56) References Cited

U.S. PATENT DOCUMENTS

| | | | | |
|---|---|---|---|---|
| 661,680 A * | 11/1900 | Andreas | ................... | 16/317 |
| 2,001,507 A | 5/1935 | Stribling | | |
| 2,719,693 A * | 10/1955 | Penberthy | ................. | 248/339 |
| 2,880,452 A * | 4/1959 | Forgach | ................... | 16/277 |
| 2,986,769 A * | 6/1961 | Hammond | ................. | 16/293 |
| 3,211,494 A * | 10/1965 | Husko | ......................... | 296/76 |
| 3,747,271 A * | 7/1973 | Adamski | .................. | 49/340 |
| 3,893,207 A * | 7/1975 | Rudaitis et al. | ........... | 180/69.21 |
| 3,956,793 A * | 5/1976 | Jewell | ........................ | 16/368 |
| 4,012,807 A * | 3/1977 | Kern | ........................... | 16/288 |
| 4,070,050 A * | 1/1978 | Glock et al. | ............... | 292/339 |
| 4,134,179 A * | 1/1979 | Silaghi | ...................... | 16/287 |
| 4,263,978 A * | 4/1981 | Jackson | .................. | 180/69.21 |
| 4,281,733 A * | 8/1981 | Miller et al. | ............. | 180/69.21 |
| 4,372,411 A * | 2/1983 | Flower | .................... | 180/89.15 |
| 4,438,826 A * | 3/1984 | Bewers | .................... | 180/89.14 |
| 4,530,412 A * | 7/1985 | Sigety, Jr. | ................ | 180/69.21 |
| 4,630,698 A * | 12/1986 | Siewert et al. | ............. | 180/69.24 |
| 4,899,420 A * | 2/1990 | Bye et al. | ..................... | 16/16 |
| 5,322,336 A * | 6/1994 | Isler | ......................... | 296/100.1 |
| 5,433,507 A * | 7/1995 | Chang | ..................... | 297/367 R |
| 5,435,406 A * | 7/1995 | Gaffoglio et al. | .......... | 180/69.21 |
| 5,516,168 A | 5/1996 | Tomaszewski-Link | | |
| 5,544,388 A * | 8/1996 | Chiura | ...................... | 16/375 |
| 5,575,513 A | 11/1996 | Tuttle | | |
| 5,588,705 A * | 12/1996 | Chang | ..................... | 297/367 R |
| 5,890,556 A * | 4/1999 | Shearn et al. | ............. | 180/69.21 |
| 5,975,228 A * | 11/1999 | Parfitt | ....................... | 180/69.21 |
| 6,047,445 A * | 4/2000 | Mennen | ................... | 16/374 |
| 6,167,977 B1 * | 1/2001 | Adamson et al. | ............ | 180/69.2 |
| 6,217,108 B1 * | 4/2001 | Sasaki | .................... | 296/187.09 |
| 6,254,169 B1 * | 7/2001 | Arthur | ................... | 296/100.07 |
| 6,367,123 B1 * | 4/2002 | Cheal et al. | ................. | 16/370 |

(Continued)

FOREIGN PATENT DOCUMENTS

JP   2006-281879   10/2006

*Primary Examiner* — Jeffrey J Restifo
*Assistant Examiner* — Brodie Follman
(74) *Attorney, Agent, or Firm* — Plumsea Law Group, LLC (57) ABSTRACT

A hood system with a plurality of hood hinges is disclosed. The hood hinges associated with the hood system include a hole configured to receive a removable fastener. By inserting a fastener in the hole when the hood is in a fully open position, a protrusion on the hood hinge can rest against the removable fastener to maintain the hood in the fully open position.

20 Claims, 5 Drawing Sheets

U.S. PATENT DOCUMENTS

| | | | |
|---|---|---|---|
| 6,397,434 B1 * | 6/2002 | Cheal et al. | 16/370 |
| 6,428,062 B1 * | 8/2002 | Roehl | 292/339 |
| 6,453,510 B1 * | 9/2002 | Cummins et al. | 16/343 |
| 6,453,511 B2 * | 9/2002 | Sato | 16/360 |
| 6,513,617 B2 * | 2/2003 | Sasaki et al. | 180/274 |
| 6,520,557 B2 * | 2/2003 | Benthaus et al. | 296/76 |
| 6,520,558 B1 * | 2/2003 | Katterloher et al. | 296/100.06 |
| 6,554,093 B2 * | 4/2003 | Sasaki et al. | 180/274 |
| 6,578,651 B2 * | 6/2003 | Murase | 180/89.17 |
| 6,588,525 B2 * | 7/2003 | Brogly et al. | 180/69.21 |
| 6,609,583 B2 * | 8/2003 | Schillaci et al. | 180/69.21 |
| 6,618,904 B1 * | 9/2003 | Nagy | 16/370 |
| 6,668,422 B2 | 12/2003 | Tolmei | |
| 6,702,360 B1 * | 3/2004 | Santos et al. | 296/100.07 |
| 6,817,435 B2 * | 11/2004 | Takeuchi | 180/274 |
| 6,834,735 B2 * | 12/2004 | Kim | 180/69.21 |
| 6,892,423 B2 * | 5/2005 | Cheal et al. | 16/289 |
| 6,910,545 B2 * | 6/2005 | Haun | 180/69.2 |
| 6,932,396 B2 * | 8/2005 | Masseth et al. | 292/338 |
| 7,080,428 B2 * | 7/2006 | Hyde | 16/265 |
| 7,137,174 B2 * | 11/2006 | Derbis et al. | 16/289 |
| 7,150,073 B2 | 12/2006 | Stewart | |
| 7,392,873 B2 * | 7/2008 | Habacker | 180/69.2 |
| 7,506,716 B1 * | 3/2009 | Salmon et al. | 180/274 |
| 7,815,007 B2 * | 10/2010 | Mori et al. | 180/274 |
| 2002/0000022 A1 * | 1/2002 | Schillaci et al. | 16/319 |
| 2002/0011372 A1 * | 1/2002 | Sasaki et al. | 180/274 |
| 2002/0014361 A1 * | 2/2002 | Murase | 180/69.2 |
| 2002/0180233 A1 * | 12/2002 | Benthaus et al. | 296/76 |
| 2005/0179286 A1 * | 8/2005 | Adachi | 296/193.11 |
| 2005/0279550 A1 * | 12/2005 | Saville et al. | 180/69.21 |
| 2005/0283948 A1 * | 12/2005 | Hyde | 16/361 |
| 2006/0000653 A1 * | 1/2006 | Telford et al. | 180/69.21 |
| 2006/0027955 A1 * | 2/2006 | Adoline et al. | 267/64.12 |
| 2006/0086551 A1 * | 4/2006 | Cleland et al. | 180/69.2 |
| 2006/0273622 A1 * | 12/2006 | Laird | 296/168 |
| 2007/0029833 A1 * | 2/2007 | Kuhr | 296/76 |
| 2007/0075554 A1 * | 4/2007 | Gavriles | 292/339 |
| 2007/0102219 A1 * | 5/2007 | Park | 180/274 |
| 2008/0016651 A1 * | 1/2008 | Marsh et al. | 16/361 |
| 2009/0050388 A1 * | 2/2009 | Leong | 180/69.21 |
| 2009/0084619 A1 * | 4/2009 | Lin | 180/69.2 |
| 2009/0194348 A1 * | 8/2009 | Faubert et al. | 180/69.21 |
| 2009/0266638 A1 * | 10/2009 | Hayashi et al. | 180/274 |
| 2010/0180399 A1 * | 7/2010 | Patzer et al. | 16/54 |

* cited by examiner

HOOD SYSTEM WITH MULTIPLE OPEN POSITIONS

BACKGROUND OF THE INVENTION

1. Field of the Invention

The present invention relates to motor vehicles and in particular to a hood hinge.

2. Description of Related Art

Motor vehicles typically include hoods to provide access to an engine of a motor vehicle, as well as other components of the motor vehicle. Sometimes, hoods may be configured to open to various heights, including a position that allows a customer easy access to the engine bay to check oil levels or perform other routine maintenance. Often, hoods will also be configured to open to a wider position than that position used by a customer. For example, some hoods may be configured to open to a position that is wider than the customer position to allow a mechanic or other service technician to more easily perform advanced vehicle maintenance.

Gas dampers or prop rods are disclosed in the related art to open the hood to various heights. Using dampers may require a mechanic to adjust the mounting position of the dampers to open the hood to various heights. There is a need in the art for a design that eliminates the need to adjust the mounting position of the dampers.

SUMMARY OF THE INVENTION

A hood system with a hinge is disclosed. Generally, this system can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a hood system for a motor vehicle, comprising: a hinge configured to attach a hood to the motor vehicle; a hood having a closed position, a first open position and a second open position; wherein a damper is used to maintain the hood in the first open position; and wherein the hinge is used to maintain the hood in the second open position.

In another aspect, the invention provides a hood system for a motor vehicle, comprising: a hinge configured to attach a hood to the motor vehicle, the hinge comprising an upper portion and a lower portion; the upper portion including a first end portion configured to attach to a hood and the upper portion including a second end portion configured to attach to the lower portion; the second end portion including a protrusion; the lower portion comprising a hole configured to receive a removable fastener when the hood is in an a fully open position; and wherein the protrusion is configured to rest against the removable fastener to maintain the hood in the fully open position.

In another aspect, the invention provides a method of operating a hood system for a motor vehicle, comprising the steps of: raising a hood to a first open position, wherein the hood is held in the first open position by a damper; detaching a first end of the damper from a mounting portion of the hood; raising the hood to a second open position that is wider open than the first open position; and locking a hinge of the hood in the second open position and maintaining the hood in the second open position.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
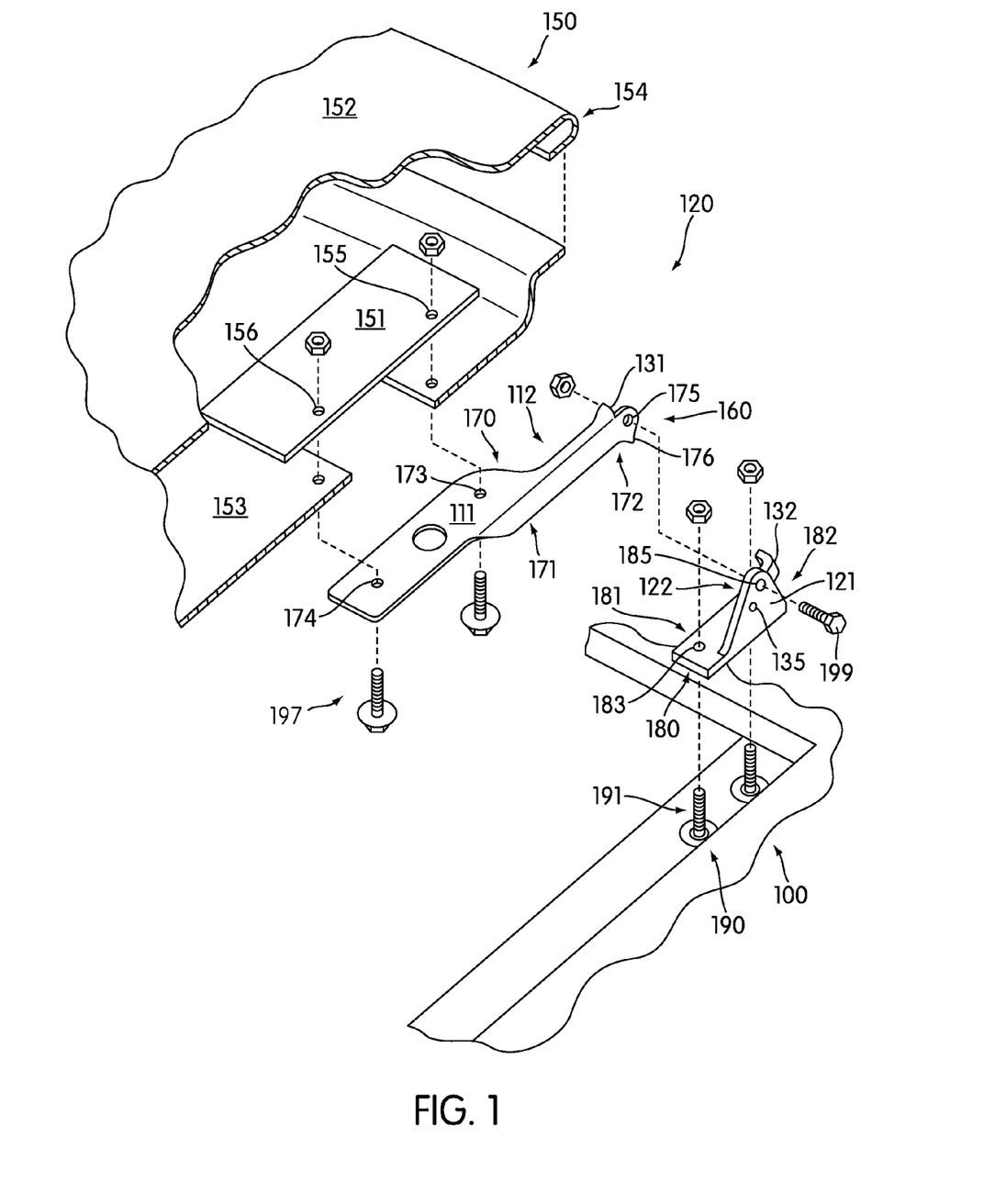
FIG. 1 is exploded an isometric view of an embodiment of a portion of a hood and a hood hinge.

FIG. 1 is an exploded isometric view of an embodiment of a portion of motor vehicle 100. Generally, motor vehicle 100 could be any type of motor vehicle, including, but not limited to cars, trucks, vans, minivans, SUVs, motorcycles, scooters, boats, personal watercraft, and aircraft.

In some cases, a motor vehicle may be configured with a hood system that covers a portion of the motor vehicle. In this embodiment, motor vehicle 100 is configured with hood system 120. Hood system 120 is configured to cover an engine compartment of motor vehicle 100. In particular, hood system 120 includes hood 150 to cover an engine compartment of motor vehicle 100. FIG. 1 illustrates a right side rear portion of hood 150. This right side rear portion of hood 150 may be disposed adjacent to a driver of motor vehicle 100.

In the current embodiment, hood 150 comprises hood skin 152 and hood frame 153. Hood skin 152 may provide a smooth continuous surface visible on the exterior of motor vehicle 100. Also, hood frame 153 may be associated with the underside of hood 150.

In some embodiments, hood frame 153 may be disposed generally parallel to hood skin 152 before sloping upwards to join hood skin 152 at rearward edge 154. In other embodiments, hood frame 153 and hood skin 152 may have different shapes. In some cases, the shape of hood frame 153 may be configured to form a cavity within hood 150.

Generally, hood 150 can include provisions to stiffen one or more portions of hood 150. In some cases, a cavity within hood 150 may be configured with materials or structures to stiffen hood 150. In other cases, hood frame 153 may have a multicone inner panel design that stiffens hood 150 in some portions. In the current embodiment, hood 150 includes hood stiffening plate 151.

For illustrative purposes, hood skin 152 is cut away in order to show hood stiffening plate 151. In this embodiment, hood stiffening plate 151 is disposed between hood skin 152 and hood frame 153. In other embodiments, hood stiffening plate 151 can be disposed on an underside of hood frame 153.

In one embodiment, hood stiffening plate 151 may have a rectangular shape. However, in other embodiments, hood stiffening plate 151 may be configured in a different shape that may be disposed between hood skin 152 and hood frame 153. With this configuration, hood stiffening plate 151 may reinforce a portion of hood 150 and can provide an attachment point for one or more components of a hood system. For purposes of clarity, only some components of hood 150 are illustrated in this Figure.

Typically, a hood may be securely attached to a motor vehicle with a plurality of hood hinges. In some embodiments, a plurality of hood hinges may be disposed on a lateral edge of an engine compartment to secure a hood to a motor vehicle. In other embodiments, a plurality of hood hinges may be disposed at a forward edge of the engine compartment to secure a hood to a motor vehicle. In still other embodiments, a plurality of hood hinges may secure a hood to a motor vehicle at a rearward edge of the engine compartment.

Hood system 120 includes first hood hinge 160. In this embodiment, first hood hinge 160 is disposed near rearward edge 154 of hood 150. Generally, first hood hinge 160 may be any type of hinge including, but not limited to detachable hood hinges, geared hood hinges, hinges with gas shocks and other types of hinges. With this arrangement, first hood hinge 160 secures hood 150 to motor vehicle 100.

In this embodiment, first hood hinge 160 comprises upper portion 170 and lower portion 180. Upper portion 170 may be configured to attach to, and pivot with respect to, lower portion 180. In some cases, upper portion 170 may be associated with hood 150. Similarly, lower portion 180 may be associated with motor vehicle 100. In particular, lower portion 180 may be associated with frame 190 of motor vehicle 100 that encloses an engine compartment of motor vehicle 100. With this configuration, first hood hinge 160 allows hood 150 to connect to, and pivot with respect to motor vehicle 100.

In one embodiment, upper portion 170 of first hood hinge 160 further includes first end portion 171 and second end portion 172. First end portion 171 is configured to connect first hood hinge 160 to hood 150. Generally, first end portion 171 can connect first hood hinge 160 to hood 150 in any manner known in the art. In some embodiments, first end portion 171 may be disposed within a cavity of hood 150 to secure hood hinge 170 to hood 150. In other embodiments, first end portion 171 may be attached to hood frame 153. In still other embodiments, first end portion 171 may be attached to hood frame 153 and hood stiffening plate 151. In one embodiment, first end portion 171 may be fastened to hood stiffening plate 151 through gaps in hood frame 153.

In order to attach to hood stiffening plate 151, first end portion 171 includes first mounting hole 173 and second mounting hole 174 configured to receive fasteners 197. Likewise, hood stiffening plate 151 is configured with first mounting hole 155 and second mounting hole 156. By inserting a first fastener through first mounting hole 173 of first end portion 171 and first mounting hole 155 of hood stiffening plate 151 and a second fastener through second mounting hole 174 and second mounting hole 156, first end portion 171 can be attached to hood stiffening plate 151. With this arrangement, first hood hinge 160 can be secured to hood 150. Although the current embodiment uses two fasteners to secure first end portion 171 to hood 150, in other embodiments any number of fasteners may be used. Additionally, any number of fastening holes could be provided on a hinge upper, a stiffening plate and/or a hood frame in other embodiments.

Although hood stiffening plate 151 is attached to hood frame 153 using one or more fasteners in this embodiment, other embodiments could include other provisions for attaching hood stiffening plate 151 to hood frame 153. In another embodiment, for example, hood stiffening plate 151 may be welded directly to hood frame 153. In still another embodiment, hood stiffening plate 151 could be integrally formed with hood frame 153.

In addition, upper portion 170 includes provisions to connect to lower portion 180 of first hood hinge 160. In this embodiment, second end portion 172 of upper portion 170 includes first pivot hole 175. First pivot hole 175 may be configured to receive a fastener to attach second end portion 172 of upper portion 170 to lower portion 180.

In a similar manner to upper portion 170, lower portion 180 also includes a first end portion and a second end portion. In particular, lower portion 180 includes first end portion 181 and second end portion 182. First end portion 181 is configured to connect first hood hinge 160 to motor vehicle 100. Generally, first end portion 181 may be configured in any manner known in the art to connect first hood hinge 160 to motor vehicle 100. In some embodiments, first end portion 181 may be secured to motor vehicle 100 using fasteners. Any type of fasteners may be used to attach first end portion 181 to motor vehicle 100 including, but not limited to bolts, screws, hex screws, rivets, and other types of fasteners. In other embodiments, first end portion 181 could be welded to motor vehicle 100 or attached using other provisions. In this embodiment, first end portion 181 includes a plurality of mounting holes 183 configured to receive fasteners. In order to fasten first end portion 181 to motor vehicle 100, bolts 191 can be inserted through mounting holes disposed within frame 190 and through plurality of mounting holes 183. With the fastening of bolts 191 to first end portion 181, lower portion 180 may be secured to frame 190 of motor vehicle 100.

Furthermore, lower portion 180 includes provisions to connect to upper portion 170. In this embodiment, second end portion 182 of lower portion 180 is configured to connect to upper portion 170. In particular, second end portion 182 includes second pivot hole 185. Second pivot hole 185 may be configured to receive a fastener to secure second end portion 182 to upper portion 170.

In order to assemble first hood hinge 160, lower portion 180 may be attached to upper portion 170. Generally, the assembly of first hood hinge 160 may be accomplished in any manner known in the art. In the current embodiment, first pivot hole 175 of upper portion 170 may be aligned with second pivot hole 185 of lower portion 180 to allow a fastener to secure upper portion 170 and lower portion 180.

While aligning first pivot hole 175 with second pivot hole 185, a side of second end portion 172 of upper portion 170 may be disposed adjacent to a side of second end portion 182 of lower portion 180. In this embodiment, second end portion 172 of upper portion 170 comprises first side 111 and second side 112, disposed opposite first side 111. Likewise, second end portion 182 of lower portion 180 includes first side 121 and second side 122, disposed opposite first side 121. In this case, first side 111 and first side 121 may be associated with an outside of first hood hinge 160. In other words, first side 111 and first side 121 face outward from an engine compartment of motor vehicle 100. Similarly, second side 112 and second side 122, not visible in FIG. 1, can be associated with an inside of first hood hinge 160. With this arrangement, second side 112 and second side 122 face inward toward an engine compartment of motor vehicle 100.

In some cases, first side 111 of second end portion 172 may be disposed adjacent to second side 122 of second end portion 182 when aligning first pivot hole 175 with second pivot hole 185. Following the alignment of first pivot hole 175 with second pivot hole 185, pivot bolt 199 may be inserted through second pivot hole 185 on first side 121 of lower portion 180 and into first pivot hole 175 of upper portion 170. With the securing of pivot bolt 199, lower portion 180 may be attached to upper portion 170. This connection facilitates the pivoting of upper portion 170 with respect to lower portion 180 allowing first hood hinge 160 to open hood 150 from a closed position.

Typically, a hood system includes provisions for propping open a hood to allow access to an engine compartment. In some embodiments, a hood system may be configured to prop open a hood in a single open position. In other embodiments, a hood system may be configured to prop open a hood in two different open positions. In some cases, a hood may be configured to open to a first open position. In some cases, the first open position may be associated with a customer or user position. In other words, the first position may be a position that allows customers or users of a motor vehicle to check fluid levels, access batteries as well as perform other basic maintenance. A hood system can also be configured to open to a second position. In some cases, the second open position may be associated with a service position. In other words, the second position may be a position used by a mechanic that is servicing the motor vehicle. For example, to perform work on an engine, a mechanic may need the hood to be open to almost ninety degrees to allow for full access to the engine, as well as to provide room for adding and/or removing components within the engine bay.

In different embodiments, the first open position and the second open position can be associated with different angles of the hood with respect to the motor vehicle. In some embodiments, the first open position may be associated with a hood angle in the range of 10 to 74 degrees. Similarly, a hood may be propped open at an angle in the range of 75 to 90 degrees in the second open position. In other words, the second open position is wider open than the first open position of the hood. In other embodiments, the first open position and second open position can be associated with any other angles of the hood as well.

Generally, a hood system can include provisions to prop open a hood. In some embodiments, a prop rod may be used to open a hood to a first open position and/or a second open position. In other embodiments, a damper may be used to open a hood to a first open position and/or a second open position. However, in embodiments using a damper, the mounting position of the damper with respect to the hood may need to be changed in order to move the hood between a first open position and a second open position. This process of re-mounting the damper can be time intensive. Furthermore, in such cases, the hood system may require an extra damper stiffening plate to be used for mounting the damper when the hood is in the second open position. In particular, different model vehicles may require slightly different damper stiffening plates, which can increase manufacturing costs.

In some embodiments, a hood system may include provisions for opening a hood to a second position without the use of a damper or prop rod. For example, in some embodiments, the hood system could include one or more hinges that can be locked in place when the hood is disposed in the second open position. In one embodiment, a hinge can be provided with a fastener that maintains the hinge in a predetermined position that corresponds with the second open position of the hood.

In the current embodiment, first hood hinge 160 includes provisions for locking hood 150 in a second open position. In particular, upper portion 170 and lower portion 180 cooperate to prop open hood 150 in a second open position. To lock hood 150 in an open position, upper portion 170 includes protrusion 176. Protrusion 176 extends outward from second end portion 172 of upper portion 170. Generally, protrusion 176 may be disposed on any portion of second end portion 172. In some embodiments, protrusion 176 can be disposed on a periphery of second end portion 172. In some cases, protrusion 176 may be disposed above first pivot hole 175. In other cases, protrusion 176 may be disposed laterally adjacent to first pivot hole 175. In this embodiment, protrusion 176 is disposed below first pivot hole 175. With this arrangement, protrusion 176 may extend below second end portion 172.

Generally, protrusion 176 may extend outward from second end portion 172 with any shape including, but not limited to triangular shapes, rectangular shapes, elliptical shapes, regular shapes, irregular shapes as well as other types of shapes. In this embodiment, protrusion 176 extends outward with a generally triangular shape as illustrated in FIG. 1. With this configuration, protrusion 176 can cooperate with lower portion 180 to maintain hood 150 in a second open position.

In some embodiments, second end portion 182 of lower portion 180 includes hole 135. Hole 135 is configured to receive a removable fastener. Generally, hole 135 may be configured to receive any type of fastener known in the art including, but not limited to bolts, screws, hex screws and other types of fasteners. In the current embodiment, hole 135 is configured to receive a removable hex bolt.

Generally, hole 135 may be disposed on any portion of second end portion 182 that allows a removable fastener to be inserted into hole 135 when hood 150 in a second open position. In some embodiments, hole 135 may be disposed on second end portion 182 above second pivot hole 185. In other embodiments, hole 135 may be disposed laterally adjacent to second pivot hole 185. In still other embodiments, hole 135 can be disposed on second end portion 182 below second pivot hole 185. In some cases, hole 135 may be disposed on second end portion 182 below and to the rear of second pivot hole 185. In this embodiment, hole 135 is disposed on second end portion 182 below and forward of second pivot hole 185.

In order to maintain hood 150 in a second open position, a removable fastener may be inserted into hole 135 when hood 150 is raised to a second open position. With hood 150 in a second open position, upper portion 170 may be pivoted with respect to lower portion 180 so that protrusion 176 is disposed forward of the removable fastener in hole 135. By inserting a removable fastener into hole 135, the removable fastener will be disposed adjacent to protrusion 176. In particular, protrusion 176 will rest against the removable fastener to maintain hood 150 in the second open position. Using this configuration, hood 150 may be propped in a second open position. This will be discussed in more detail later in this detailed description.

A hood system can include provisions to prevent a hood from over rotating and potentially contacting a windshield. In this embodiment, first hood hinge 160 includes provisions to prevent hood 150 from opening wider than a second open position. This can be accomplished by configuring upper portion 170 and lower portion 180 with shapes that allow first hood hinge 160 to open hood 150 to a second open position but prevent hood 150 from opening further than a second open position. In particular, second end portion 172 of upper portion 170 and second end portion 182 of lower portion 180 can be configured with stops that cooperate to prevent hood 150 from opening wider than a second open position. In this case, second end portion 172 of upper portion 170 includes first stop 131. Likewise, second end portion 182 of lower portion 180 includes second stop 132.

First stop 131 and second stop 132 may be configured with any shape to prevent upper portion 170 from opening wider than a second open position including, but not limited to triangular shapes, rectangular shapes, elliptical shapes, regular shapes, irregular shapes as well as other types of shapes. In the current embodiment, first stop 131 and second stop 132 have generally rectangular shapes.

Generally, first stop 131 and second stop 132 can be disposed on any portion of second end portion 172 and second end portion 182, respectively, so that first stop 131 and second stop 132 contact one another when hood 150 is in a second open position. In other words, first stop 131 and second stop 132 can extend from any portion of second end portion 172 and second end portion 182, respectively, that allows first stop 131 and second stop 132 to contact each other when hood 150 is in a second open position. In this embodiment, first stop 131 is disposed above first pivot hole 175 so that first top 131 extends above second end portion 172 of upper portion 170. Similarly, second stop 132 is disposed to extend laterally rearward from second end portion 182 of lower portion 180. This configuration allows upper portion 170 to pivot open and raise hood 150 to a second open position before first stop 131 contacts second stop 132 and prevents further opening of hood 150. Details of this arrangement will be discussed in more detail later in this detailed description.

Generally, upper portion 170 and lower portion 180 of hood hinge 160 may be made of any substantially durable material. In some embodiments, upper portion 170 and lower portion 180 may be made of similar materials. In other embodiments, upper portion 170 and lower portion 180 may be made of different materials. In one embodiment, upper portion 170 and lower portion 180 may be made of a metal material or a metallic alloy.

Although only first hood hinge 160 is illustrated in FIG. 1, it should be understood that hood system 120 may be associated with additional hood hinges. In some cases, hood system 120 may be associated with a second hood hinge disposed on a left rearward portion of a hood 150. The second hood hinge may be configured in a substantially similar manner as first hood hinge 160. In particular, the second hood hinge may secure hood 150 to motor vehicle 100 and allow hood 150 to pivot open to provide access to an engine compartment. Furthermore, the second hood hinge may be configured to prop open hood 150 in a second open position.

Figure 2:
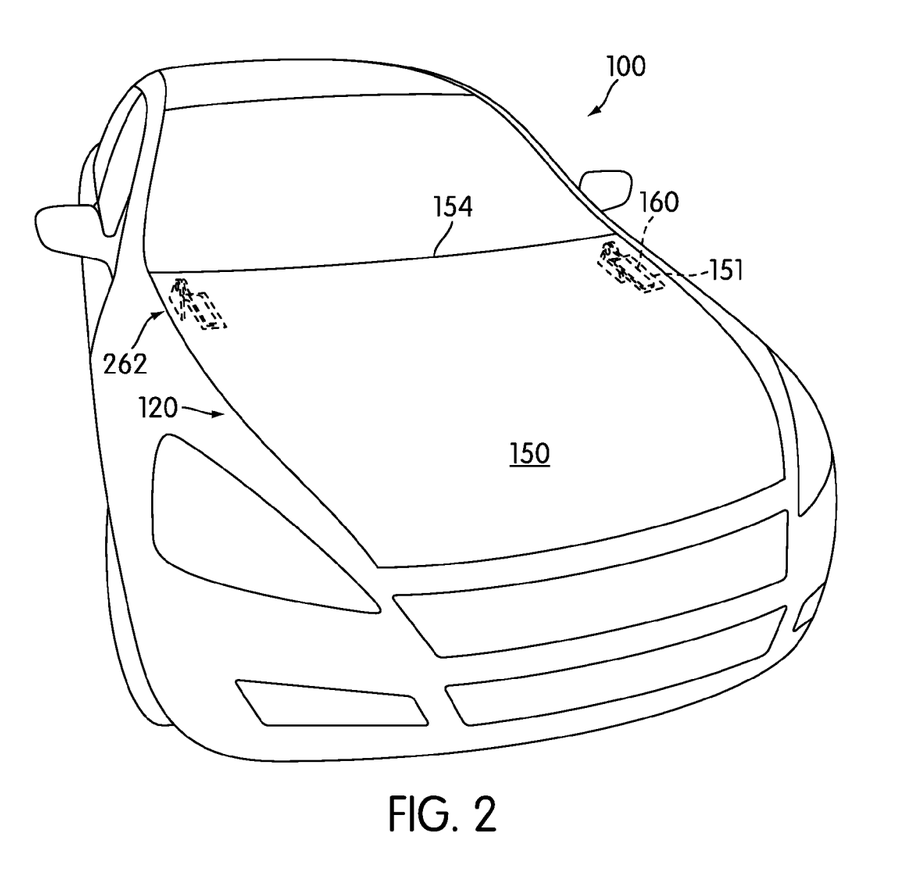
FIG. 2 is an isometric view of an embodiment of a hood in a closed position.

FIGS. 2-9 are intended to illustrate embodiments of hood 150 of hood system 120 in a closed position, first open position and a second open position. Referring to FIG. 2, hood 150 of hood system 120 is in a closed position. In this embodiment, hood system 120 includes first hood hinge 160 and second hood hinge 262. As previously discussed, first hood hinge 160 may be associated with right portion of rearward edge 154 of hood 150. Likewise, second hood hinge 262 may also be associated with rearward edge 154. In particular, second hood hinge 262 may be disposed on a passenger side portion of rearward edge 154 of hood 150. For illustrative purposes, first hood hinge 160 and second hood hinge 262 are illustrated in phantom so that first hood hinge 160 and second hood hinge 262 may be seen below hood 150 in the closed position.

Figure 3:
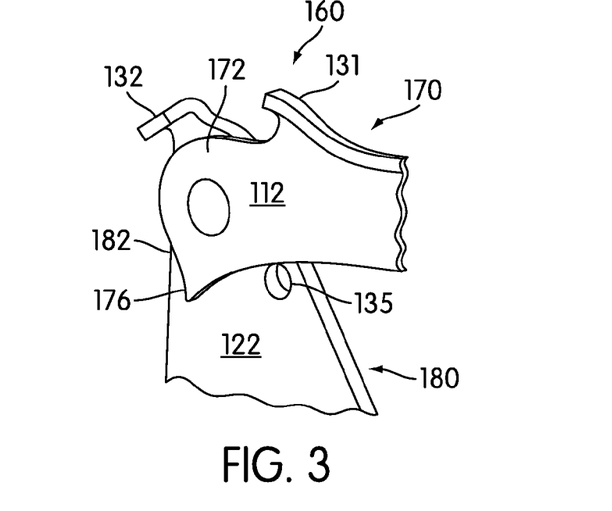
FIG. 3 is an enlarged side view of an embodiment of a portion of a hood hinge when a hood is in a closed position.

FIG. 3 illustrates an enlarged view of a portion of first hood hinge 160 when hood 150 is in a closed position. In particular, this enlarged view shows second side 112 of second end portion 172 of upper portion 170. In addition, second side 122 of second end portion 182 of lower portion 180 may be seen in FIG. 3. In some cases, upper portion 170 can be disposed substantially parallel to a frame of motor vehicle 100 when hood 150 is in the closed position. Although, only first hood hinge 160 is illustrated in FIG. 3, it should be understood that second hood hinge 262 may be configured in a substantially similar manner as first hood hinge 160.

With hood 150 in the closed position, protrusion 176 may be spaced apart from hole 135. In some cases, a portion of hole 135 may be covered by upper portion 170. This arrangement may prevent the insertion of a removable fastener into hole 135 when hood 150 is in a closed position. In addition, first stop 131 and second stop 132 are spaced apart from each other when hood 150 is in the closed position. This configuration allows upper portion 170 to pivot with respect to lower portion 180 to open hood 150 from the closed position.

Figure 4:
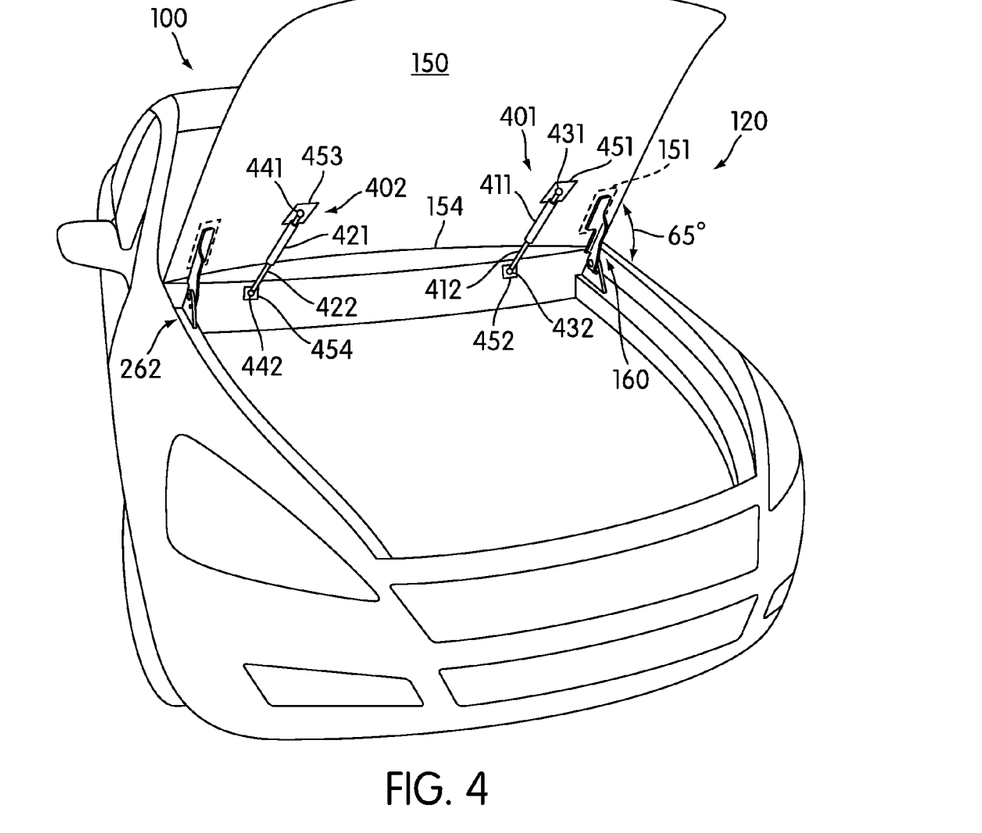
FIG. 4 is an isometric view of an embodiment of a hood in a first open position.

FIG. 4 illustrates an embodiment of a portion of motor vehicle 100 with hood 150 of hood system 120 propped open in a first open position. As previously discussed, hood 150 may be raised to a first open position that is associated with an opening angle in the range of 10 to 70 degrees. In this embodiment, hood 150 is open to an angle of approximately 65 degrees in a first open position. It will be understood that other embodiments may allow the hood to be opened to other angles. With hood 150 in this first open position, a customer or user of the motor vehicle can access various parts of the engine bay to perform routine maintenance.

In some cases, hood 150 may be propped open to a first position with assistance from a pair of dampers. In this case, first damper 401 and second damper 402 are disposed on rearward edge 154 of hood 150 to prop open hood 150 in a first open position. In particular, first damper 401 is disposed adjacent to first hood hinge 160. Likewise, second damper 402 is disposed adjacent to second hood hinge 262.

In order to prop open hood 150, first damper 401 and second damper 402 may be secured to hood 150 and motor vehicle 100. In this embodiment, first damper 401 is secured to hood 150 at first end 431 by first mounting bracket 451. First damper 401 is also secured to motor vehicle 100 at second end 432 by second mounting bracket 452. Similarly, second damper 402 is secured to hood 150 at first end 441 by third mounting bracket 453. In addition, second damper 402 is secured to motor vehicle 100 at second end 442 by fourth mounting bracket 454. With this arrangement, first damper 401 and second damper 402 may be attached to hood 150 as well as motor vehicle 100.

With first damper 401 and second damper 402 secured to hood 150 and motor vehicle 100, first damper 401 and second damper 402 may be configured to prop open hood 150. In this embodiment, first damper 401 includes first piston rod 411 and first cylinder 412 to prop open hood 150. In some cases, first piston rod 411 may be associated with first end 431. Likewise, first cylinder 412 may be associated with second end 432. In a similar manner, second damper 402 includes second piston rod 421 and second cylinder 422 to prop open hood 150. Second piston rod 421 can be associated with first end 441. Likewise, second cylinder 422 can be associated with second end 442. For purposes of clarity, only some portions of first damper 401 and second damper 402 are illustrated in this embodiment.

Generally, first damper 401 and second damper 402 may operate in any manner known in the art to prop open hood 150 in a first open position. In this embodiment, first piston rod 411 and second piston rod 421 extend outward from first cylinder 412 and second cylinder 422, respectively, to prop open hood 150 in a first open position. Furthermore, first piston rod 411 and second piston rod 421 are configured to stop extending when hood 150 reaches a first open position.

Although the current embodiment illustrates a motor vehicle including two hinges that can be locked in open positions, it will be understood that other embodiments may include a single hinge that can be locked. In particular, another embodiment may include a single hinge that can be locked in an open position on a first side of a hood. In such an embodiment, a second hinge that does not lock can also be used on a second side of a hood. In different embodiments employing a single locking hinge, the locking hinge can be disposed on either a driver side or passenger side of the motor vehicle.

Additionally, it will be understood that any number of dampers can be used in other embodiments. For example, in another embodiment a single damper may be used. In such an embodiment, the single damper may be configured to maintain the hood in a first open position that corresponds with a customer or user position. In some cases, the single damper may be associated with a driver side of the motor vehicle. In other cases, the single damper may be associated with a passenger side of the motor vehicle.

Figure 5:
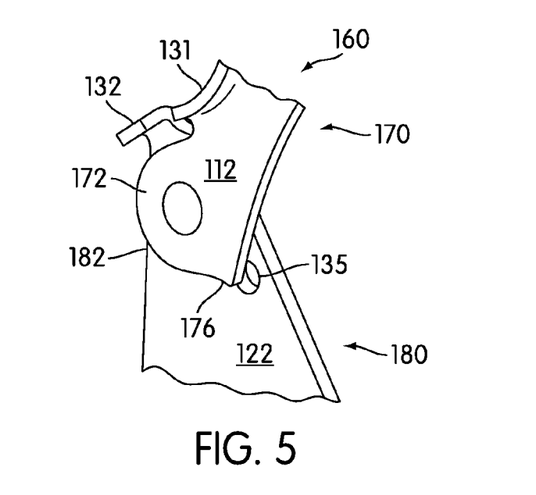
FIG. 5 is an enlarged side view of an embodiment of a portion of a hood hinge when a hood is in a first open position.

Referring to FIG. 5, an enlarged view of a portion of first hood hinge 160, upper portion 170 is pivoted with respect to lower portion 180 as hood 150 is raised and propped open in a first open position. With this configuration, upper portion 170 is disposed at an angle to lower portion 180 of first hood hinge 160. This arrangement disposes protrusion 176 closer to hole 135 than when hood 150 is in a closed position, as illustrated in FIG. 3. Furthermore, in some cases, protrusion 176 may cover a portion of hole 135 when hood 150 is in the first open position. In this embodiment, protrusion 176 covers a portion of hole 135 that is illustrated in phantom. This prevents the insertion of a removable fastener into hole 135 when hood 150 is in a first open position.

In addition, first stop 131 and second stop 132 continue to be spaced apart from each other with hood 150 in a first open position. However, the circumferential distance between first stop 131 and second stop 132 has decreased from the closed position to this first open position as seen by comparing FIGS. 3 and 5. With first stop 131 separated from second stop 132, upper portion 170 may pivot freely with respect to lower portion 180 to open hood 150 wider than a first open position.

In embodiments where a set of dampers are used to prop open a hood in a first open position, the set of dampers may need to be disengaged from the hood and/or motor vehicle before the hood can be opened wider than the first open position. In some cases, the set of dampers may be disengaged by detaching the dampers at a first end from the hood as well as detaching the dampers at a second end from the motor vehicle. In other cases, the set of dampers may be disengaged by detaching the dampers at a second end from the motor vehicle. In this embodiment, the set of dampers may be disengaged by detaching the dampers at a first end from the hood.

Figure 6:
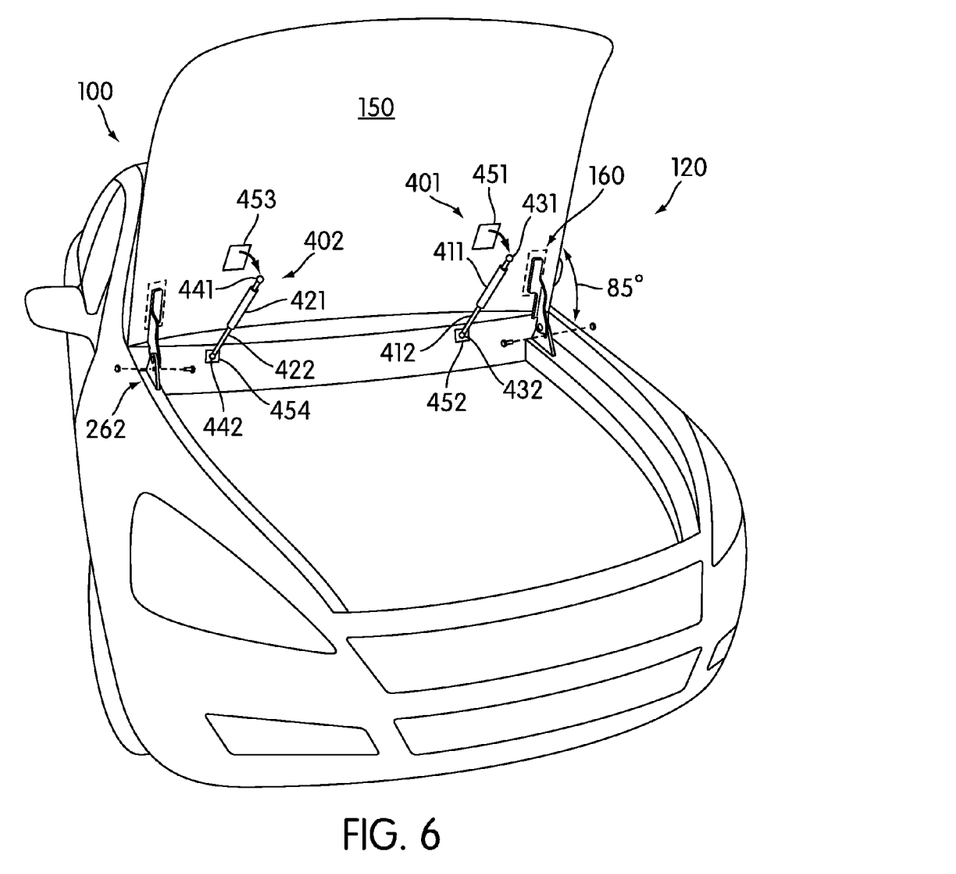
FIG. 6 is an isometric view of an embodiment of a hood raised to a second open position.

In this embodiment, first damper 401 and second damper 402 may be disengaged from hood 150 while hood 150 is in a first open position. Referring to FIG. 6, first damper 401 is disengaged from hood 150 by detaching first end 431 from first mounting bracket 451. Also, second damper 402 is disengaged from hood 150 by detaching first end 441 from third mounting bracket 453. With the detachment of first damper 401 and second damper 402, hood 150 may be raised wider than the first open position to a second open position.

As previously discussed, hood 150 may be opened to a second position that is wider open than the first open position. In this embodiment, hood system 120 is configured to open hood 150 to an angle of approximately 85 degrees in the second open position. However, in other embodiments, hood system 120 may be configured to open hood 150 to a different angle in the second open position.

Figure 7:
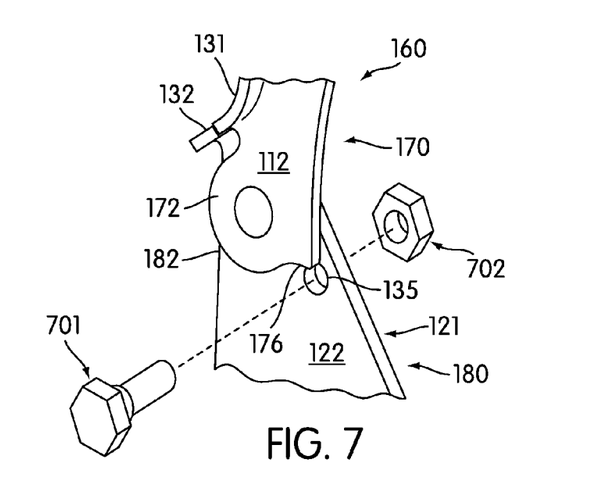
FIG. 7 is an enlarged side view of an embodiment of a portion of a hood hinge when a hood is raised to a second open position.

With hood 150 open to a second open position, first hood hinge 160 and second hood hinge 262 are configured to prevent hood 150 from opening wider than the second open position. Referring to FIG. 7, an enlarged view of a portion of first hood hinge 160, upper portion 170 has pivoted upward with respect to lower portion 180 in order to raise hood 150 to a second open position. As upper portion 170 pivots upward to raise hood 150 to a second open position, first stop 131 on upper portion 170 contacts second stop 132. This contact between first stop 131 and second stop 132 prevents upper portion 170 from pivoting further and opening hood 150 wider than the second open position.

With upper portion 170 pivoted to open hood 150 to the second open position, protrusion 176 is rotated past hole 135. In other words, protrusion 176 is disposed forward of hole 135 when hood 150 is in the second open position. Furthermore, no other portion of upper portion 170 is obstructing hole 135 when hood 150 is in the second open position. With this arrangement, a removable fastener may be inserted within hole 135 to allow first hood hinge 160 to prop open hood 150 in the second open position.

As previously discussed, hole 135 is configured to receive a hex bolt. In this embodiment, hex bolt 701 may aligned with hole 135 on second side 122 of second end portion 182 of lower portion 180. Likewise, nut 702 may be aligned on first side 721 of second end portion 182, not visible in FIG. 7, to secure hex bolt 701 to lower portion 180.

Figure 8:
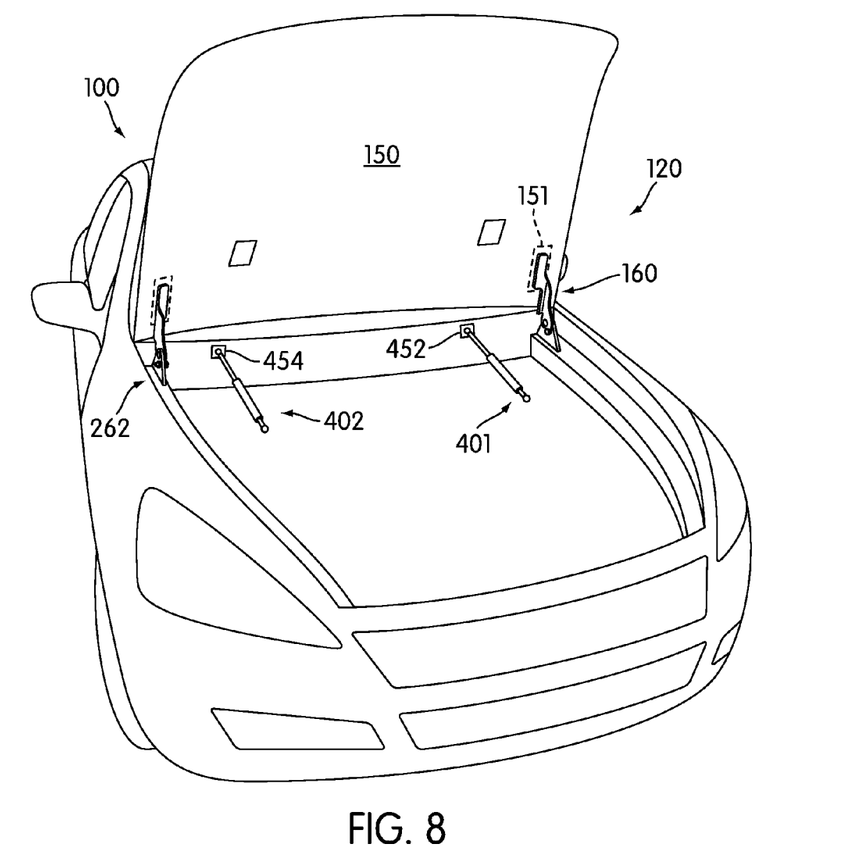
FIG. 8 is an isometric view of an embodiment of a hood in a second open position.

FIG. 8 illustrates an isometric view of a portion of motor vehicle 100 with hood 150 of hood system 120 propped open in a second open position. In this embodiment, first hood hinge 160 and second hood hinge 262 are maintaining hood 150 in the second open position. In this case, first damper 401 and second damper 402 are detached from hood 150 and disposed on an engine compartment of motor vehicle 100.

Figure 9:
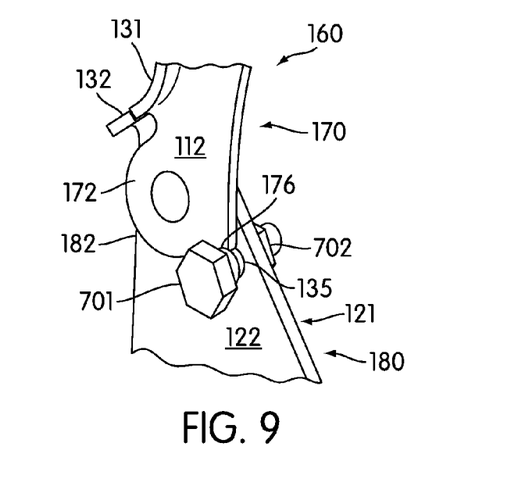
FIG. 9 is an enlarged side view of an embodiment of a portion of a hood hinge when a hood is in a second open position.

Referring to FIG. 9, an enlarged view of first hood hinge 160, hex bolt 701 is inserted within hole 135 on second side 122 and fastened with a nut on first side 121, not visible in this Figure. With the fastening of hex bolt 701 to lower portion 180, protrusion 176 on upper portion 170 may rest against hex bolt 701 to maintain hood 150 in the second open position. In some cases, protrusion 176 may be configured with a shape that corresponds to hex bolt 701 to provide a good fit between protrusion 176 and hex bolt 701. Using this configuration, protrusion 176 can prevent hood 150 from closing from the second open position. In addition, as previously discussed, first stop 131 and second stop 132 contact each other when hood 150 is in the second open position. This prevents hood 150 from opening wider than the second open position. With this configuration, first hood hinge 160 can maintain hood 150 in the second open position.

In order to lower hood 150 from a second open position, hex bolt 701 may be loosened from hole 135 by removing a nut. After removing hex bolt 701, upper portion 170 may be pivoted downward to lower hood 150. When hood 150 is lowered to a first open position, first damper 401 and second damper 402 can be re-attached to hood 150. Following the attachment of first damper 401 and second damper 402, hood 150 may be lowered to a closed position.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A hood system for a motor vehicle, comprising:
   a hinge configured to attach a hood to the motor vehicle;
   a hood having a closed position, a first open position and a second open position;
   the hinge comprising an upper portion and a lower portion;
   the upper portion including a protrusion;
   the lower portion comprising a hole configured to receive a removable fastener when the hood is in the second open position;
   wherein a damper is used to maintain the hood in the first open position;
   wherein the hinge is used to maintain the hood in the second open position; and
   wherein the damper is disengaged from the hood when the hood is in the second open position.

2. The hood system according to claim 1, wherein the first open position is a first angle associated with a customer position and the second open position is a second angle associated with a service position.

3. The hood system according to claim 1, wherein the second open position is a wider open position than the first open position.

4. The hood system according to claim 1, wherein the hood is open to an angle in the range between ten degrees and seventy four degrees in the first open position.

5. The hood system according to claim 1, wherein the hood is open to an angle in the range between seventy five degrees and ninety degrees in the second open position.

6. The hood system according to claim 1, wherein the hinge is locked in place in the second open position.

7. A hood system for a motor vehicle, comprising:
   a hinge configured to attach a hood to the motor vehicle, the hinge comprising an upper portion and a lower portion;
   the upper portion including a first end portion configured to attach to a hood and the upper portion including a second end portion configured to attach to the lower portion;
   the second end portion including a protrusion;
   the lower portion comprising a hole configured to receive a removable fastener when the hood is in an a fully open position;
   wherein the protrusion is configured to rest against the removable fastener to maintain the hood in the fully open position;
   wherein a damper is configured to maintain the hood in an intermediate position between a closed position and the fully open position; and wherein the damper is disengaged from the hood when the hood is in the fully open position.

8. The hood system according to claim 7, wherein the removable fastener is a bolt.

9. The hood system according to claim 7, wherein the second end portion of the upper portion includes a first stop that is configured to engage a second stop on the lower portion.

10. The hood system according to claim 9, wherein the first stop is disposed against the second stop when the hood is in the fully open position.

11. The hood system according to claim 10, wherein the first stop and the second stop are configured to prevent over rotation of the hood.

12. The hood system according to claim 7, wherein the damper is disposed adjacent to the hinge.

13. The hood system according to claim 7, wherein an end portion of the damper is detached from the hood to move the hood from the intermediate position to the fully open position.

14. A hood system for a motor vehicle, comprising:
   a hinge configured to attach a hood to the motor vehicle, the hinge comprising an upper portion and a lower portion;
   the upper portion including a first end portion configured to attach to a hood and the upper portion including a second end portion configured to attach to the lower portion;
   the lower portion comprising a hole configured to receive a removable fastener when the hood is in a fully open position;
   wherein a damper is used to open the hood to an intermediate position between a closed position and the fully open position;
   wherein the damper is disposed adjacent to the hinge; and wherein the damper is disengaged from the hood when the hood is in the fully open position.

15. The hood system according to claim 14, wherein the second end portion of the upper portion is configured to rest against the removable fastener to maintain the hood in the fully open position.

16. The hood system according to claim 15, wherein the second end portion of the upper portion includes a first stop that is configured to engage a second stop on the lower portion.

17. The hood system according to claim 16, wherein the first stop is disposed against the second stop when the hood is in the fully open position.

18. The hood system according to claim 17, wherein the first stop and the second stop are configured to prevent over rotation of the hood.

19. The hood system according to claim 14, wherein the hood includes a single mounting position configured to receive the damper.

20. The hood system according to claim 19, wherein an end portion of the damper is detached from the hood to move the hood from the intermediate position to the fully open position.

* * * * *